July 15, 1969    F. M. A. PICHOIR    3,456,108
APPARATUS FOR FLUORESCENT X-RAY ANALYSIS OF TEST
BODIES EMPLOYING FLUID FILTERS WITH
VARIABLE ABSORPTION CHARACTERISTICS
Filed June 27, 1966    4 Sheets-Sheet 1

Inventor:
Francoise M.A. Pichoir
BY:
Karl F. Ross
Attorney

Inventor:
Francoise M. A. Pichoir
BY:
Karl G. Ross
Attorney

July 15, 1969
F. M. A. PICHOIR
3,456,108
APPARATUS FOR FLUORESCENT X-RAY ANALYSIS OF TEST
BODIES EMPLOYING FLUID FILTERS WITH
VARIABLE ABSORPTION CHARACTERISTICS
Filed June 27, 1966
4 Sheets-Sheet 3
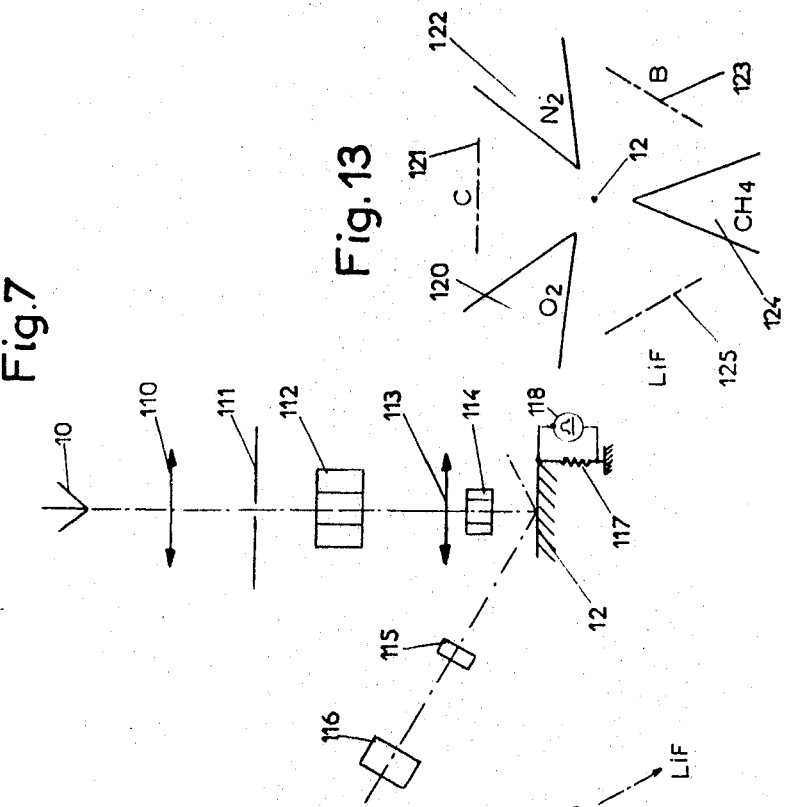
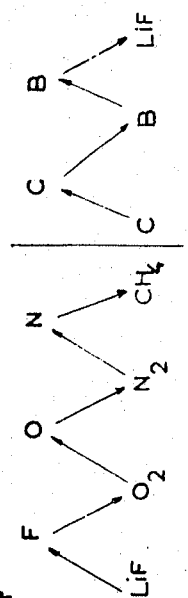
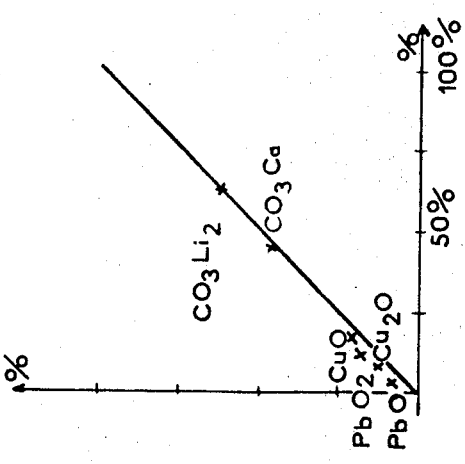
Inventor:
Francoise M.A. Pichoir
BY:
Karl F. Ross
Attorney

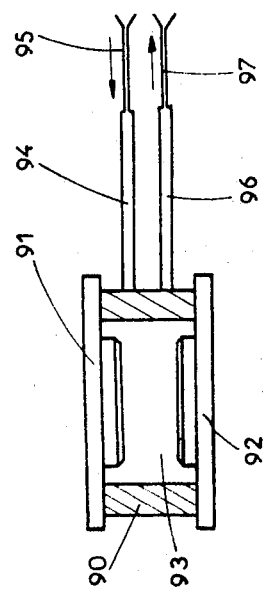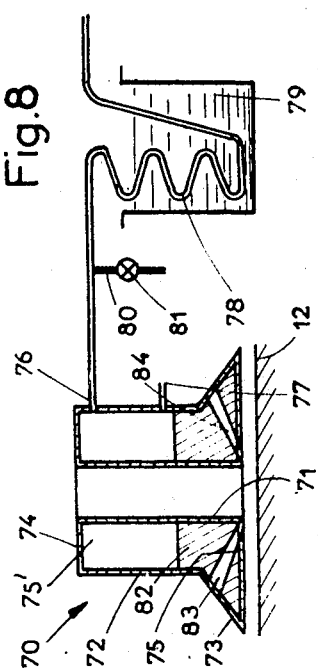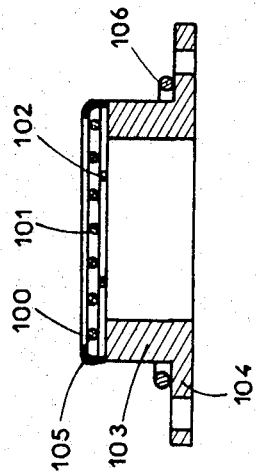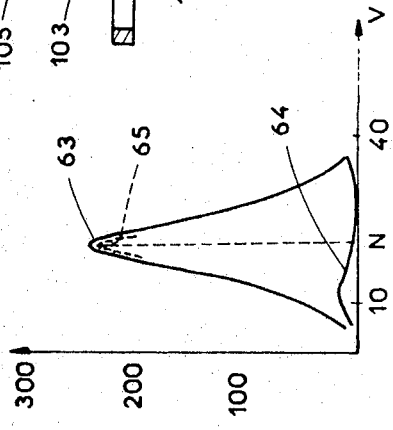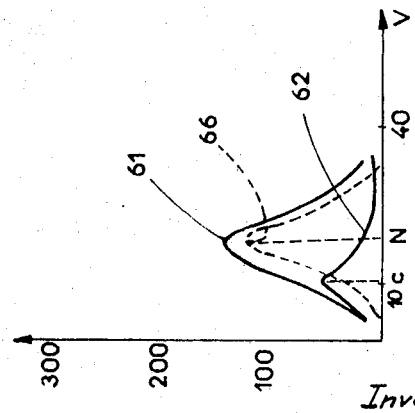
Inventor:
Francoise M. A. Pichoir
BY:
Karl F. Ross
Attorney United States Patent Office 3,456,108
Patented July 15, 1969

3,456,108
APPARATUS FOR FLUORESCENT X-RAY ANALYSIS OF TEST BODIES EMPLOYING FLUID FILTERS WITH VARIABLE ABSORPTION CHARACTERISTICS
Francoise Marie Antoinette Pichoir (born Bacquet), Paris, France, assignor to Office Nationale d'Etudes et de Recherches Aerospatiales
Filed June 27, 1966, Ser. No. 560,711
Claims priority, application France, July 9, 1965, 24,158
Int. Cl. H01j 37/26, 37/20
U.S. Cl. 250—49.5                       15 Claims

ABSTRACT OF THE DISCLOSURE

Spectrographic system for measuring the proportion of a specific element in a test body by stimulating the emission of X-rays from that body and directing them onto two parallel, differentially connected evaluation networks with inputs in the form of respective radiation filters constituted by different gaseous fluids whose aborption characteristics are substantially identical throughout a measuring range except for a narrow wavelength band within that range containing a critical wave-length characterizing the desired element, this band being bounded by respective discontinuities of the absorption curves of the two fluids. In order to establish the necessary coincidence between the two characteristics outside the narrow wave-length band referred to, means are provided for adjusting the pressure of either or both gaseous fluids and/or by admixing one of these fluids with a gas (e.g., krypton) whose absorption characteristic exhibts no discontinuity within the measuring range.

---

The present invention has for its object a process and an apparatus for the spectrographic analysis of test bodies.

It has already been proposed to effect a spectrographic analysis in order to determine the concentration of a chemical element of a test body or sample by bombarding said body with accelerated electrons, thus causing the emission by said body of a flux of X-rays identifying, by its spectral lines, the elements composing said body and by dispersing this flux through a crystal unit thus making it possible to measure, by means of a counter, the intensity of the radiation conveyed by said flux over a predetermined wave-length corresponding to the desired element.

In the apparatus used for such analysis, the crystal unit is mounted so as to assure a scanning along the wave-lengths, and, generally, the counter which receives the dispersed flux executes a motion which is mechanically co-ordinated with that of the crystal unit.

In such apparatus, however, and also in those resorting to a grating for the dispersion of the radiation flux, the aperture of the beam entering into the counter is very small, so that only a minute fraction of the energy emitted over a particular wave-length is registered by the counter, to the detriment of the sensitivity of the system.

A process has also been proposed according to which two identical radiation fluxes, derived from the bombardment of the body to be analyzed by suitably accelerated electrons, traverse, respectively, two filters presenting the same absorption characteristics, except for a comparatively narrow requency or wave-length and the determination of whose intensity of a radiation the wave-lengthis contained in said band is obtained from two counters subjected, respectively, to the radiations passed by said filters.

In this process, the filters employed consist of a solid, generally metallic, wall.

The invention is essentially characterized by the use of a gaseous medium as a filter traversed by the radiation.

The use, as a filter, of a gaseous medium eliminates the difficulties associated with solid or liquid filters in the case of very "soft" radiations because of the extreme thinness of the filters and also because of the difficulty of causing them to be balanced. The flexibility resulting from the application of a gaseous medium enables one to obtain, readily and rapidly, conditions for which the equality of the absorption coefficients of the two media, for all frequencies or wavelengths other than those contained in the narrow band corresponding to the two elements forming the base of said media, is obtained with a sufficient accuracy for the concentration of the desired chemical element to be determined with the required precision.

The invention is therefore directed not only to the adjustment, by pressure variation, of one and/or of both gaseous media, but also to the adjustment obtained by the mixture of one of the gaseous fluids with another gaseous fluid selected on account of the fact that its curve representative of the variation of the mass absorption as a function of wave-length presents no discontinuity in the pass-band of the filter, nor in the wave-length band within which the counter is responsive.

An apparatus according to the invention enables the determination of the concentration of light elements such as beryllium, boron, carbon, nitrogen, oxygen, fluorine.

The process of the invention enables the concentration to be rapidly determined, since the readings of both counters are taken simultaneously.

The invention will be best understood from the following description and the appended drawings wherein:

FIGURES 3, 4, 5 and 6 are various explanatory graphs;

FIGURE 7 is a diagrammatic view of a modication of the apparatus of FIG. 1;

FIGURE 8 shows diagrammatically one embodiment of a cooling device adapted to be used with the apparatus of FIG. 7;

FIGURES 9 and 10 are graphs relative to the operation of the systems of FIGS. 1 and 7;

FIGURE 11 shows diagrammatically one embodiment of a gas absorber incorporated in the apparatus of the invention;

FIGURE 12 is a diagrammatic view of a modication of a detail of the device of FIG. 11;

FIGURE 13 illustrates diagrammatically another arrangement of the apparatus according to an invention; and FIGURE 14 is an explanatory graph.

Figure 1:
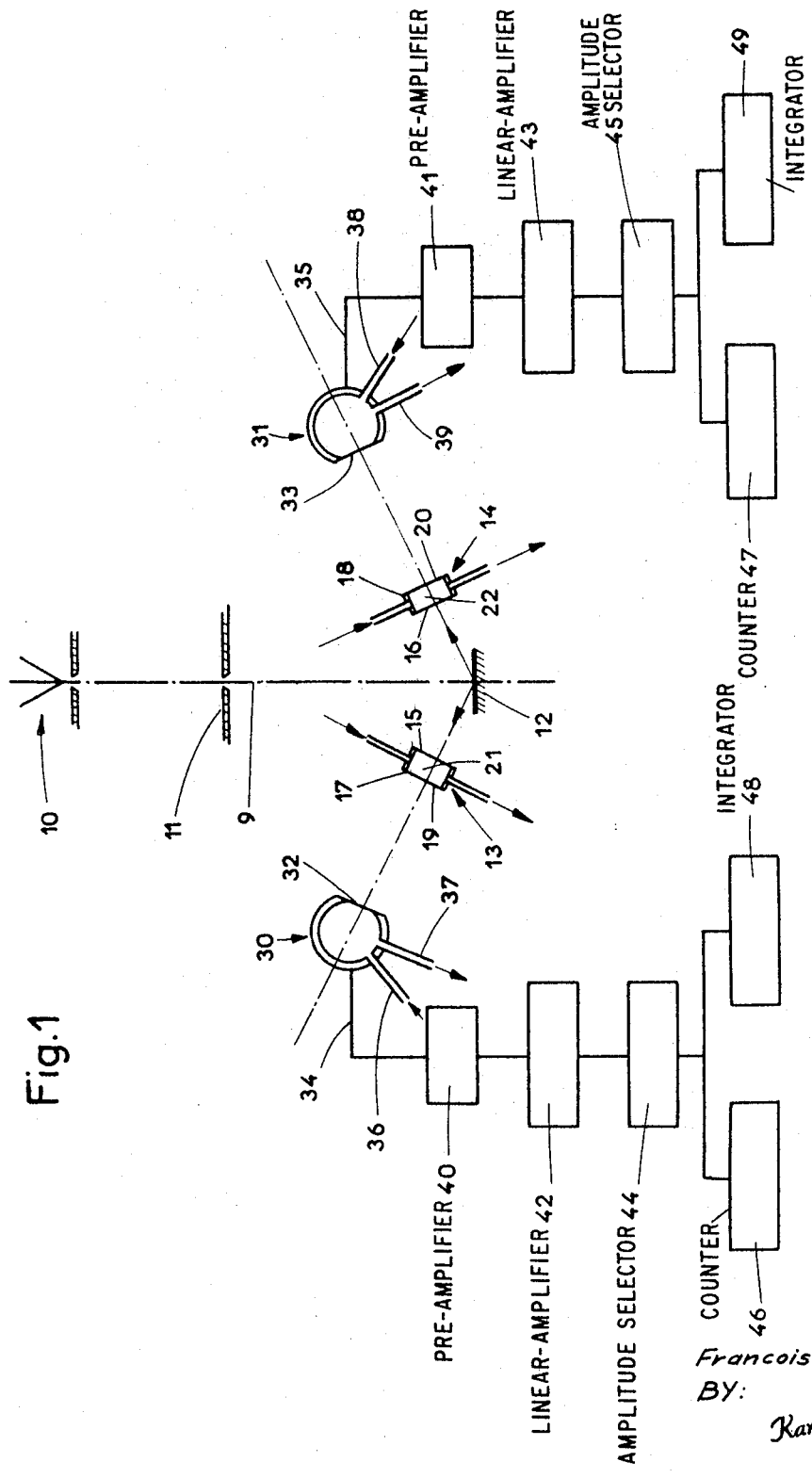
FIGURE 1 is a diagrammatic view of an apparatus according to the invention.

As seen in FIGURE 1, an electron gun 10 bombards, through a diaphragm 11, a body or sample 12 to be analyzed. Along the path of photon radiation issuing from body 12 under the effect of this bombardment there are placed two of polychromatic absorbers 13 and 14, formed and/or arranged in such a manner as to receive through their inlet faces 15 and 16 constantly identical fluxes of polychromatic radiation, which may exhibit several characteristic radiation lines and a continuous spectrum; the beams have an identical aperture, the emission pattern presenting a rotational symmetry about a line normal to the plane of the sample. Each one of the devices 13 and 14, located in a vacuum, includes an enclosure 17 and 18, bounded by the inlet faces 15 and 16 and by exit faces 19 and 20, respectively. The absorption media 21 and 22 consist, according to a feature of the invention, of gaseous fluid. Such gaseous fluids comprise, as basic constituents, elements which are close to one another in the Periodic Table and are adjusted in such a manner that their absorption capacities are identical over the whole spectrum, except in the narrow wave-length band bounded by two absorption discontinuities corresponding to said elements. To this end, means for adjusting the pressure of the gaseous fluid 21 and/or of the gaseous fluid 22 are provided.

Figure 2:
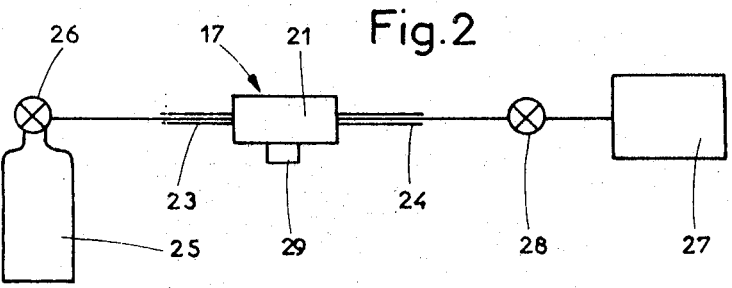
FIGURE 2 is a diagrammatic view illustrating the means for adjusting a filter forming part of the assembly of FIG. 1.

In the embodiment illustrated very diagrammatically in FIGURE 2, an enclosure, such as housing 17 of device 13, is inserted between two capillary tubes 23 and 24. Capillary tube 23 is connected to a gas bottle 25 via a cock 26. Capillary tube 24 is connected to a pump 27 through a cock 28. A manometer 29 enables an operator to read at any moment the value of the pressure inside the enclosure 17. A similar arrangement is provided for device 14. It is however to be understood that other means may be used to vary, as desired, the pressure inside the one and/or other of these enclosures.

The apparatus also comprises identical detectors or sensing devices, inserted in the path of the beams emerging from the filters, which measure in their assigned radiation range the intensity of the flux conveyed, as well as means to register the difference between these two measurements, thus yielding a measure of the intensity of the portion of the X-ray spectrum emitted by the bombarded body in the range between the wave-lengths or frequencies corresponding to the two discontinuities.

In the radiation path beyond device 13 there is inserted, to this end, a proportional counter 30 (FIGURE 1), an identical proportional counter 31 being inserted in the radiation path beyond device 14. Said counters may be of the type comprising a gas ionizable under the effect of the photons traversing their permeable walls 32, 33, respectively. Tubes such as 36, 37 and 38, 39, respectively, are provided for the admission and the exit of the ionizable gas. The counters deliver at their outlets 34, 35 electric pulses or spikes. The pulses delivered by the counters, respectively, are counted in a given length of time and the difference between the two counts is established.

Alternatively, the pulses of both counters are applied to an electronic system of forward and backward counting which delivers directly at its output the difference of the two intensities transmitted.

In the embodiment illustrated in FIGURE 1, the outputs of counters 30 and 31 are applied to preamplifiers 40 and 41, respectively, followed by linear amplifiers 42 and 43, respectively, which in turn are followed each by an amplitude selector 44 and 45, respectively. The output of each selector is applied to a counting device 46 and 47, respectively, and to an integrator 48 and 49, respectively.

Figure 3:
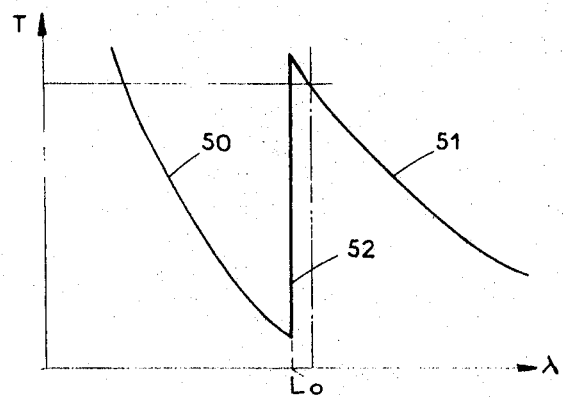

The enclosures 17 and 18 of devices 13 and 14 contain one a gaseous element and the other another gaseous element, the latter being close to the first one in the Periodic Table of the elements. In the case, selected as a non-limiting example, where the element to be analyzed in the body considered is oxygen, enclosure 17 is filled with oxygen and enclosure 18 with nitrogen. FIGURE 3 shows a graph representative of the variations of the transmission coefficient (plotted as ordinates on the diagram) of device 13 containing oxygen as a function of the wave-length λ (plotted on the abscissa) of the radiation traversing the same. This graph comprises a first portion 50 which is descending for increasing wave-lengths, and a second portion 51 also descending for increasing wave-lengths, the two portions being joined by a vertical line 52 expressing the discontinuity of the variation of the transmission coefficient for a wave-length $L_O$, characteristic of the oxygen.

Figure 4:
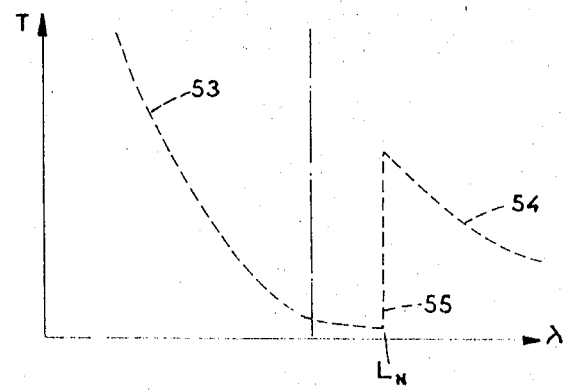

FIGURE 4 is a similar graph, but relating to the transmission coefficient of nitrogen contained in device 14. The curve for nitrogen comprises a first portion 53, descending for increasing wave-lengths, and a second portion 54 also descending for increasing wave-lengths, said two portions being connected by a vertical line 55 representing the discontinuity of the variation of the transmission coefficient for a wave-length $L_N$ characteristic of nitrogen.

Figure 5:
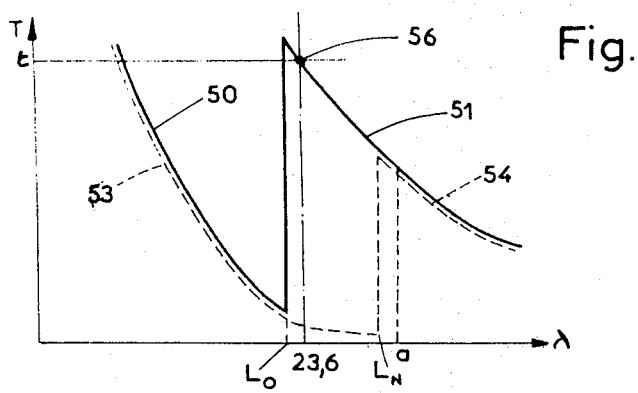

To adjust the apparatus, the pressure inside the enclosure 17 and/or inside the enclosure 18 is varied in such a manner that, by tracing on the same graph the curve representative of the variation of the transmission coefficient of the first enclosure and the curve representative of the variation of the transmission coefficient of the second enclosure, curve portion 50 merges—or substantially merges—with portion 53 and curve portion 54 merges—more or less—with curve portion 51. Such a diagram is shown in FIGURE 5. The pressure increase in enclosure 17 causes the whole of the diagram of FIGURE 3—while simultaneously deforming it—to descend parallel to the axis of the ordinates and, the conversely, a pressure reduction will cause this diagram to be displaced in the opposite direction. Also, an increase in pressure in enclosure 18 causes curves 53 and 54 to be displaced downwards, parallel to the axis of the ordinates, and a decrease of pressure displaces said diagram in the opposite direction. In fact, the diagrams in FIGURES 3 and 4 are plotted for enclosures wherein the pressure has been adjusted to establish the correlation of FIG. 5.

The absorption discontinuities of oxygen and of the nitrogen being relatively offset, means may be provided to equalize the absorption capacities of both devices on both sides of the frequency band lying between the boundaries $L_O$ and $L_N$. To this end, arrangements are provided to dilute the basic of the devices by a small amount of a heavy gas.

In order to improve the coincidence of branches 50 and 53, on the one hand, and of curves 51 and 54, on the other hand, I propose in accordance with one aspect of the invention to introduce into one and/or into the other enclosure a gas whose mass-absorption coefficient, and, consequently, whose transmission coefficient, can be plotted as curves having no discontinuity in the counting band, which is determined by the limiting wavelengths between which the counters 30 and 31 are responsive to radiation; generally, these band limits spaced farther apart than the gap between $L_O$ and $L_N$. In the particular case illustrated, the introduction of krypton as a modifying constituent has provided the required result. It was found that this admixture may be proportioned in such a manner as to obtain a satisfactory superposition of the curves. The invention takes here advantage of the fact that the proportional counters have a response sensitivity which tends rapidly to zero with increasing deviation from the wave-length corresponding to their maximum sensitivity, which allows equalization of the absorptions only in a somewhat narrow range of wave-lengths wherein the heavy element selected presents no discontinuity and which includes the band $L_O$–$L_N$ separating the two absorption discontinuities.

By causing the pressures prevailing inside the enclosures 17 and 18 to vary, the curves 50, 51 and 53, 54 are completely displaced, without modification of their relative positions. This adjustment is effected so that the transmission at the critical point, i.e. for the wave-length corresponding to the element for which a quantitative analysis is to be made in the test body should have a value affording good sensitivity while minimizing the magnitude of possible error. Thus, for instance, the point 56 of curve 51 corresponding to the value of the wave-length of the line K of oxygen, namely 23.6 angströms, close to $L_O$, represents a transmission factor $t$, of the order of 30 to 40%.

The above values are not, of course, of a limitative character, but are given only as an indication.

To realize these adjustments, one may, in practice, operate as follows:

The pressure which should prevail in an enclosure, for instance in enclosure 17, is approximately determined, by calculation, so that one of the curves—in this case curve 50, 51—should have a critical point whose abscissa represents the characteristic wave-length of the element to be located and whose ordinate T is of a suitable value. This point is point 56 in the case considered. The apparatus is then operated and the pressure varied in the other enclosure 18 in such a way that, for an element other than oxygen whose characteristic wave-length is within the range of sensitivity of the counters, equal readings are obtained from the two counting networks. Thus, for instance, I have shown in FIGURE 5 the characteristic abscissa $a$ of spectrum line K of nitrogen which may be utilized (for example, with a sample of boron nitride).

The apparatus is then ready for use: to determine the proportion of a light element such as oxygen, body or in a sample 12 (FIG. 1), the latter is subjected to the electron beam 9, whose electrons are suitably accelerated. The acceleration voltage used is comparatively small, of the order of 2 kv. The possibility of using a draining voltage of comparatively reduced value results from the comparatively large aperture angle of the X-ray beams entering the counters. It is also possible to thus reduce— or even eliminate—the corrections normally required to take account of the fact that the X-rays emitted by the deep layers of the sample are partially absorbed by the less deep ones.

The reading provided by the counting device 47 are subtracted from those supplied during the same period of time by the counting device 46 and the difference characterizes the oxygen proportion found in the body analyzed.

The amplitude selectors 44 and 45 enable the count to be taken at various levels corresponding to various wavelengths, for instance at uniformly staggered levels.

It was thus possible to measure the intensity of the characteristic spectrum line of oxygen emitted by a sample. The absorbing media were constituted of nitrogen and oxygen, respectively. The enclosures, which were identical, were closed by windows which were transparent to soft X-rays and constituted by layers of collodion having a thickness of 0.1 micron deposited on grid-carriers as described hereinafter with reference to FIGS. 11 and 12.

The invention was also utilized with success for quantitative nitrogen analysis, the absorbing substances being in this case nitrogen and methane.

It was found, in this connection, that for a nitrogen absorber and a methane absorber the absorbing rates were identical, which avoids the need for correlation by and mixture of a gaseous compound whose absorption curve presents no discontinuity in the sensitivity band of the counters, as described above.

In the case of a sample on the basis of copper, whose nitrogen content was only 4% by weight of the sample, it was possible to obtain a signal/background noise ratio equal to 2.5 for the nitrogen line, thus rendering possible the sensing of nitrogen contents lower than 1% in a matrix of average atomic weight.

(It should be noted, in this connection and at this point, that the sensing quality of a characteristic line is measured by the signal/background-noise ratio, i.e., the ratio between the intensity of the characteristic line and the spurious intensity which may derive either from the continuous spectrum or from undesirable reflections or diffusions.)

FIGURE 6 is a graph giving the results of quantitative analysis made for various compounds, as noted on the graph. The true oxygen percentages are plotted on the abscissae and the measured oxygen percentages are plotted on the ordinates. The measured proportions of oxygen are all corrected relative to the continuous background, by assuming that the intensity of this continuous background is proportional to the average atomic number of the sample (the continuous background was measured on a reference sample of a given atomic number). The diagram shows a satisfactory linearity of the relation emission-concentration; the points representative of the various components are very close to the straight line at an angle of 45° or even on said line. The acceleration voltage for the electrons was 2000 volts minimizing the need for X-ray-absorption correction in the sample itself; the electronic output was 0.1 microampere; a count of 420 pulses per second was nevertheless obtained for pure oxygen (calculated by extrapolating the curve), still higher counts being realizable by using beams of greater aperture.

The invention has also for its object the provision of an apparatus for determining the concentration of one or more of the following elements: beryllium, boron, carbon, nitrogen, oxygen, fluorine.

FIGURE 7 is a fragmentary diagrammatic view of an apparatus for this purpose which is more elaborate than that of FIG. 1. It comprises, arranged between the electron gun 10 and the sample 12, a condenser 110, a diaphragm 111 for the adjustment of the beam width, a scanning device 112 for displacing the spot, the diameter of which is of the order of a micron, on the sample, an objective or magnetic lens 113, a cooler 114, absorbers 115 (only one shown) and, following each absorber, a counter 116. The arrangement comprises an ohmic resistance 117 inserted between sample 12 and ground, the potential difference across this resistance enabling the sample to be visually inspected by means of an electronic image, for instance on the screen of an oscilloscope 118.

FIGURE 8 illustrates, diagrammatically, one embodiment of a cooling device (114, FIG. 7) adapted to be used with the apparatus of the invention. The cold wall of this device is constituted by the surface of an annular enclosure 70 whose inner periphery 71 is that of a tube traversed by the electron beam, its outer periphery 72 being also a tube ending in a flared portion 73. The enclosure comprises, in addition, a hollow upper ring member 74 and a solid lower ring member 75, the latter ring member being closely adjacent sample 12. In the annular gap 75' flows a very cold fluid entering through a tube 76 and existing through a tube 77, tube 76 including a coil 78 dipping into a tank 79 containing, for instance, liquid air. A branch tube 80, controlled by a cock 81 is adapted to admit nitrogen in the case where, during idle time, it is desired to increase the temperature of the enclosure wall. The lower portion (as seen in the figure) is formed by a solid block 82 pierced by bores 83 and 84 for the passage of the X-ray fluxes.

It was found that the results provided by an apparatus comprising a cold wall adjacent the sample were substantially improved. This is due to the fact that in spite of the sample being placed in a vacuum, there exist nevertheless in the enclosure certain compounds—mainly of carbon—and, under the action of the bombardment to which the sample is submitted, a deposit is formed, upon impingement of the electron beam on the sample, of a layer known as "contamination layer." It was found that said layer had effects which were the more objectionable the lighter the elements whose concentration had to be determined.

The influence of a cold wall in the immediate vicinity of the region of illumination of the sample may be illustrated by comparing the diagrams of FIGURES 9 and 10. In these diagrams there are plotted on the abscissae the amplitudes V in volts, as selected by an amplitude selector such as units 44 and 45 (FIG. 1) connected in electronic networks in the outputs of absorbers 13, 14. On the ordinates, there are plotted the number of pulses counted during the given period of time for a same amplitude interval. The curves 61 and 62 represent, respectively, the pulses counted in the network associated with a nitrogen filter and the pulses counted in the network associated with a methane filter, during the analysis of the content of a sample of boron nitride, after a bombardment of five minutes.

In FIGURE 10 there are plotted, on the same scale, the same curves obtained with an identical sample, after a bombardment of five minutes, from counts taken at both ends of the network of the same apparatus, but provided with a cooling device. The corresponding curves are indicated at 63 and 64. The peak of curve 63 is increased with respect to that of curve 61, and the peak of curve 64 is reduced with respect to that of curve 62. The maximum difference of the ordinates of curves 63 and 64 at the points of the abscissae corresponding to the peak of curve 63 is, as indicated at point 65 of the differential curve, substantially greater than that of point 66 in the graph of FIGURE 9, the ordinate of point 65 being precisely the one from which the concentration of nitrogen is determined in the sample.

Reference is now made to FIGURE 11, which illustraset details of a gas absorber used in the apparatus of the invention. Said absorber has a body 90 defining between two windows 91 and 92, a radiation-permeable 93 containing the gaseous absorption medium, of predetermined pressure, a tube 94 being connected to a source of gas, after insertion of via a capillary tube 95 and a tube 96 being connected to a vacuum source, after insertion of via a capillary tube 97.

FIGURE 12 shows an embodiment of a window such as those designated 91, 92 in FIG. 11. The structure comprises a diaphragm 100 of collodion or the like positioned on a grid 101 which, in turn, is supported by a grid 102 on a flange 103 of a frame 104 adapted to be secured to body 90 by screws or the like. A collodion bead 105 ensures tightness of the diaphragm at its junction with the flange. A joint 106 is provided to ensure tightness between the window and the body of the filter.

An apparatus which has given satisfactory results— whose indicated parameters, however, are merely illustrative—had its filter placed at about 4 cm. from the sample and the counter at about 12 cm. therefrom; the window of the counter had a rectangular outline whose sides were equal, respectively, to 12 and 16 mm. The angle under which the window was viewed from the sample had thus a magnitude of about 9° in its major dimension.

The invention also contemplates an apparatus for determining the concentration of several elements, with the aid of several pairs of filters, in certain combinations.

As shown digrammatically in FIGURE 13, an apparatus having six axes of symmetry, which is advantageous in limiting the aberrations of the lenses employed comprises, symmetrically positioned about sample 12, alternate gas absorbers and solid absorbers, two successive absorbers being angularly spaced apart by 60°. Following a absorber 120, in the clockwise direction, are a solid absorber 121, a gas absorber 122, a further solid absorber 123, a further gas absorber 124 and a solid absorber 125.

In the bottom row of FIGURE 14, there are indicated the various absorption media represented by the filters 120–125 of FIG. 13, i.e., the absorbers carbon, boron, lithium fluoride and the gaseous absorbers oxygen, nitrogen, methane; the element whose concentration is to be determined by the apparatus, i.e., fluorine, oxygen, nitrogen, carbon or boron, as listed on the top line between the two absorbers which are utilized in its detection.

In above description, the spectrographically analyzed X-rays are emitted by the body under the effect of a bombardment of said body by accelerated electrons. It is however to be understood that the invention also extends to the case where the emission of X-rays is obtained by means other than such bombardment.

What is claimed is:

1. A process for the spectrographic analysis of a body containing an element capable of X-ray emission of a characteristic wave-length, comprising the steps of stimulating said body into emitting X-rays, passing said X-rays along two parallel paths through a pair of radiation filters including respective gaseous fluids whose absorption characteristics within a predetermined wave-length range are substantially identical except for a narrow wave-length band containing said characteristic wave-length, electronically measuring the intensities of X-rays within said wave-length range respectively passed by said filters, adjusting the relative pressure of said gaseous fluids to maintain said intensities substantially identical throughout said range outside said narrow band, and differentially combining said intensities to obtain a reading representative of the proportion of said element in said body.

2. A process as defined in claim 1 wherein said body is stimulated by electronic bombardment.

3. A system for analyzing X-radiation, comprising filter means in the path of said X-radiation, said filter means including a radiation-permeable chamber filled with a gaseous fluid having an absorption characteristic with a discontinuity indicative of the presence of a predetermined wave-length of impinging X-radiation, pressure-control means communicating with said chamber for modifying said characteristic, and output means beyond said filter means for evaluating the intensity of X-radiation traversing said gaseous fluid.

4. A system as defined in claim 3 wherein said gaseous fluid includes a relatively light first constituent with a discontinuous absorption characteristic and a relatively heavy second constituent with a continuous absorption characteristic within said operating range.

5. A system as defined in claim 4 wherein said first constituent is oxygen or nitrogen, said second constituent being krypton.

6. A system as defined in claim 3 wherein said chamber has entrance and exit windows for said X-radiation each including a supporting frame and a collodion membrane spanning said frame.

7. A system for the spectrographic analysis of a test body containing an element adapted to emit X-radiation of a characteristic wave-length identifying said element, comprising:
   a source of energy for stimulating the test body into emission of X-radiation;
   first and second filter means disposed in the path of said X-radiation, said first and second filter means having generally continuous absorption characteristics for said X-radiation within a predetermined range of operating wave-length except for respective discontinuities defining the boundaries of a narrow wave-length band within said range including said characteristic wave-length, said first filter means including a radiation-permeable chamber filled with a radiation-absorbing gaseous fluid;
   control means communicating with said chamber for maintaining the pressure of said gaseous fluid at a value resulting in substantial coincidence of the absorption characteristics of said first and second filter means throughout said operating range with the exception of said narrow band,
   and output means disposed beyond said first and second filter means for detecting the intensities of X-rays within said operating range respectively passed thereby and for differentially combining said intensities to obtain a reading representative of the proportion of said element in said test body.

8. A system as defined in claim 7 wherein said second filter means comprises a solid radiation absorber.

9. A system as defined in claim 7 wherein said source of energy comprises a generator of an electron beam impinging upon said test body.

10. A system as defined in claim 9, further comprising cooling means disposed adjacent the point of impingement of said electron beam upon said test body, said cooling means including a tubular enclosure axially traversable by said electron beam, said structure having a hollow annular portion remote from the location of said test body connected to a source of cooling fluid and further having a solid annular portion proximal to said location provided with bores trained upon said point of impingement for receiving said X-rays issuing therefrom and directing same toward said first and second filter means.

11. A system as defined in claim 9, further comprising scanning means for deflecting said beam across said test body, impedance means connected to said test body and visual indicator means connected across said impedance means.

12. A system as defined in claim 7 wherein said second filter means comprises another radiation-permeable chamber filled with a second radiation-absorption gaseous fluid, said fluids consisting at least predominantly of elemental gases occupying adjoining positions in the Periodic Table.

13. A system as defined in claim 12 wherein said elemental gases are oxygen and nitrogen.

14. An apparatus for the spectrographic analysis of X-radiation emitted by stimulated test bodies, comprising a set of first filters selectively interposable in the path of X-radiation to be analyzed, a set of second filters selectively interposable in the path of said X-radiation, said first filters including radiation-permeable chambers filled with gaseous fluids and control means for maintaining the pressures of said fluids at predetermined values corresponding to selected absorption characteristics, said second filters comprising solid radiation absorbers, and output means for detecting and differentially combining the intensities of X-rays passed by selected combinations of said filters as an indication of the presence of a specific wave-length in the X-radiation to be analyzed.

15. An apparatus as defined in claim 14 wherein said gaseous fluids are oxygen, nitrogen and methane, said solid absorbers being lithium fluoride, carbon and boron.

References Cited

UNITED STATES PATENTS

| | | | |
|---|---|---|---|
| 1,264,374 | 4/1918 | Florez | 350—160 |
| 1,894,942 | 1/1933 | Chromy | 350—161 |
| 2,826,701 | 3/1958 | Columbe. | |
| 2,916,621 | 12/1959 | Wittry. | |
| 3,030,512 | 4/1962 | Harker | 250—51.5 X |

ARCHIE R. BORCHELT, Primary Examiner

A. C. BIRCH, Assistant Examiner

U.S. Cl. X.R.

250—51.5, 86; 350—312